United States Patent
Moy-Yee et al.

(10) Patent No.: US 6,724,761 B1
(45) Date of Patent: Apr. 20, 2004

(54) METHOD AND APPARATUS FOR SERIAL CELL REPLICATION FOR MULTICAST IN A CELL SWITCH

(75) Inventors: Lisa A. Moy-Yee, Torrance, CA (US); Gefferie H. Yee-Madera, San Gabriel, CA (US); Darren R. Gregoire, Redondo Beach, CA (US); Jaime L. Prieto, Jr., Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/408,048

(22) Filed: Sep. 29, 1999

(51) Int. Cl.$^7$ ................................................ H04B 7/212
(52) U.S. Cl. ...................................... 370/390; 370/323
(58) Field of Search ............................. 370/395.1, 398, 370/399, 395.3, 395.31, 395.32, 395.42, 395.6, 395.63, 395.7, 395.72, 389, 390, 432, 316, 323, 412

(56) References Cited

U.S. PATENT DOCUMENTS

| | | | |
|---|---|---|---|
| 5,701,300 A | * 12/1997 | Jeon et al. | 370/392 |
| 5,774,465 A | * 6/1998 | Lau et al. | 370/395.3 |
| 5,946,313 A | * 8/1999 | Allan et al. | 370/397 |
| 6,307,861 B1 | * 10/2001 | Hogg et al. | 370/432 |
| 6,310,875 B1 | * 10/2001 | Nichols et al. | 370/388 |

\* cited by examiner

Primary Examiner—Alpus H. Hsu
Assistant Examiner—Thien Tran

(74) Attorney, Agent, or Firm—Noel F. Heal

(57) ABSTRACT

A method and apparatus for implementing multicast in a space-based communication system is disclosed. The present invention allows for the use of a buffer in which to store data packets prior to replication in a multicast application. The present apparatus includes a buffer (102), a header memory (103), and an ASIC (101) to store and extract received data packets and replicate them as required. The ASIC (101) includes a switch interface (201), a queue manager (203), a header processor (205), a holding buffer (207), and a arbitration interface (209). The switch interface (201) is connected to the queue manager (203). The queue manager (203) is connected to the buffer (102), the header processor 205, the holding buffer (207), and the arbitration and switch interface (204). The header processor (205) is connected to the header memory (103). The header processor (205) and the holding buffer (207) are connected to an arbitration and switch interface (209), whose output, in turn, is fed back through the switch matrix routing fabric (211) for routing and eventual downlink transmission. The method includes the steps of receiving data packets from the switch matrix routing fabric (302); storing the information payload and the header in the buffer(304); and extracting the information payload and header from the buffer (306). The method further includes the steps of buffering the information payload to the holding buffer (308); provisioning the header to the header processor (310); addressing the header memory (312); merging the new header obtained from the header memory with the information payload (314); and performing subsequent processing on the assembled cell (316). The latter two steps are repeated until all replicated cells are assembled and sent on for routing and eventual downlink transmission.

26 Claims, 2 Drawing Sheets

METHOD AND APPARATUS FOR SERIAL CELL REPLICATION FOR MULTICAST IN A CELL SWITCH

CROSS-REFERENCE TO RELATED APPLICATIONS

This application is related to the following commonly assigned application: "Satellite Communication Multicast Processing Techniques", Ser. No. 09/407,416, having inventors: Geffrie Yee-Madera, Darren Gregoire, Zoltan Stroll, Scott Takahashi and Roland Wong. This application is incorporated herein by reference in its entirety.

BACKGROUND OF THE INVENTION

The present invention relates generally to satellite communication systems, and more particularly, to a method and means for data packet replication for multicast functions in a satellite communication system.

Modern communications networks carry staggering amounts of information. Increasingly, that information is transmitted through communications satellites. A single satellite may have, for example, the equivalent of 30 or more uplink bands, each able to receive an uplink signal with a bandwidth of 250 Mhz. The resultant uplink data path may have a capacity of 8 to 10 gigabits per second or more.

Where a satellite is a link in a communications network, many individual ground stations may encode, modulate, and transmit uplink signals to the satellite. Each uplink signal may consist of hundreds of individual data channels each, for example, carrying data for a telephone conversation. Similarly, the downlink signals produced by the satellite and transmitted to ground stations often include data for hundreds of users. Additionally, crosslink signals may transmit data between satellites.

Satellite (and terrestrial) communication systems divide the data traffic on the uplink, downlink, and crosslink signals into discrete pieces of information, and each discrete piece of information may subsequently be transmitted over different selected channels in the communication network. The discrete pieces of information are referred to, for example, as "frames" or "data packets," depending on the particular system. In past terrestrial systems, for example, the data packets may be Asynchronous Transfer Mode (ATM) cells.

Each ATM cell is a specifically formatted data packet that is 53 bytes long and includes 48 information bytes (referred to below as the "information payload") and five header bytes (called the "header"). The header contains necessary information for a network to transfer cells between nodes over an ATM connection.

Specifically, the header contains a logical address consisting of an 8-bit Virtual Path Identifier (VPI) and a 16-bit Virtual Channel Identifier (VCI). The header also contains a 4-bit Generic Flow Control (GFC), a 3-bit payload type (PT), and a 1-bit Cell Loss Priority (CLP) indicator. The header is error-protected by a 1-byte header error control (HEC) field.

The VPI/VCI field of an ATM header cell contains ATM address information. A virtual channel is used for the uni-directional transport of ATM cells, each channel having associated with it a VCI value. A virtual path (VP) is an aggregate bundle of virtual channels (VCs). These paths have associated VPI values, each VPI value identifying a bundle of one or more VCs. Because two different VCs belonging to two different VPs at a given interface may have the same VCI value, a VC is only fully identified at an interface if both its VPI and VCI values are indicated. Thus, the ATM address field is divided into two subfields. The first subfield contains the VPI. The information in this field is used to switch virtual paths consisting of groups of virtual channels. The second subfield contains the VCI, used to switch virtual channels. The information in the VCI identifies a single virtual channel on a particular virtual path.

Connection to an ATM network is a shared responsibility. The user and network provider must agree as to the support of application bandwidth demands and other traffic characteristics that will be provided. To further one aim of such an agreement, that is assurance that the integrity of the transmitted data packets is maintained, network users categorize cells according to Quality of Service (QoS) classes. QoS is defined by specific parameters for an application that conforms to a particular traffic contract. A traffic contract is negotiated between a user and a network provider, and the user's input cells are monitored to ensure that the negotiated traffic parameters are not violated. These parameters can be directly observed and measured by the network. QoS is defined on an end-to-end basis, an end, for example, being an end workstation, a customer premises network, or a private or public ATM user-to-network interface (the point at which the user accesses the network). QoS is defined in terms of any number of measurement outcomes.

The measurement outcomes used to define ATM performance parameters include successful cell transfer, errored cell transfer, lost cell, misinserted cell, and severely errored cell block. These performance parameters correspond to the generic QoS criteria of accuracy, dependability, and response time. Measurements of cell error ratio, severely errored cell block ratio, and cell misinsertion rate correspond to the QoS criterion of accuracy; measurements of cell loss ratio correspond to the QoS criterion of dependability; and measurements of cell transfer delay, mean cell transfer delay, and cell delay variation correspond to the QoS criterion of response time.

Cell error ratio (CER) is defined as the number of errored cells divided by the sum of successfully transferred cells and errored cells. Severely errored cell block ratio is defined as the number of severely errored cell blocks divided by the total transmitted cell blocks. Cell misinsertion rate (CMR) is the number of misinserted cells divided by a specified time interval. Cell loss ratio (CLR) is defined as lost cells divided by transmitted cells. Cell transfer delay is the elapsed time between a cell exit event at a measurement point and a corresponding cell entry event at another measurement point for a particular connection.

The cell transfer delay between two measurement points is the sum of the total inter-ATM node transmission delay and the total ATM node processing delay between the measurement points. Mean cell transfer delay is the average of a specified number of absolute cell transfer delay estimates for one or more connections. Cell delay variation is a measure of cell clumping, i.e., how much more closely cells are spaced than the nominal interval. Cell clumping is an issue because if too many cells arrive too closely together, cell buffers may overflow.

QoS classes are defined with pre-specified parameter threshold values. Each QoS class provides performance to an ATM virtual connection as dictated by a subset of ATM performance parameters. Additional details on ATM cell headers and QoS classes may be found in numerous references including *ATM Theory and Application*, (David E. McDysan & Darren L. Spohn, McGraw-Hill, Inc. 1995).

The use of QoS classes for ATM switches assures the integrity of the data packets. In addition, in most applications (where capacity generates revenue), one significant performance factor is the amount of information that is passed through the communication system (i.e., throughput). Generally, the higher the data throughput, the higher the revenue potential.

In the past, a bar to implementing a high throughput space-based switch was that an earth terminal could only receive information in a particularly configured downlink at any given moment in time. The downlink configuration depends on several parameters including, for example, frequency, coding, and polarization of the downlink at the time the satellite transmits the information. Unlike information transmitted terrestrially, not every earth terminal may receive information in every downlink, because earth terminals are only configured to receive a particularly configured downlink at any given moment in time.

Thus, space-based systems, unlike terrestrial systems, face unique challenges in their delivery of information to ground stations. In other words, past terrestrial networks did not provide a suitable infrastructure for communication satellites.

Furthermore, revenue generated from operation of satellite communication systems is affected by considerations of weight and power consumption of the switch used in the satellite communication system. In a space-based implementation, higher weight and increased power consumption in the switch translate to higher spacecraft and launch costs and the potential for reduced throughput. These, in turn, may have the effect of lowering potential revenue. Thus, cell switch features which, when implemented, minimize weight and power consumption of the switch are desirable because such added feature functionality does not adversely affect the bottom line.

One such feature is that of providing a multicast capability. The use of multicast in a cell switch allows sending the same data to a selectable number of destinations. This feature addresses inefficient use of bandwidth in terrestrial switches. Prior to multicast feature availability, a broadcast function was commonly used, which sent the same data to all possible destinations. With the implementation of multicast, only those destinations requiring the data received it, making unused bandwidth available for other data packet transmission.

Multicast capability, as implemented in terrestrial-based switches, is inappropriate for use in satellite communication systems due to its cost, weight, and complexity. Nonetheless, the need for multicast functionality in space-based cell switches is particularly important because if available, it would serve to maximize the efficient use of uplink, downlink, and crosslink bandwidth.

Without on-board satellite multicast capability, replication must be performed on the ground, with multiple copies sent through the uplink. Thus, because a source terminal is required to send the same data repeatedly using this replication strategy, uplink bandwidth is wasted. Similarly, with only a broadcast capability in the space-based switch, data would be sent to all downlink and crosslink beams, resulting in wasted downlink and crosslink bandwidth. Multicast capability in a space-based switch would allow data to be sent only to those destinations requiring it, thus maximizing revenue potential. Whether used in terrestrial or space-based systems, multicast ideally supports modern network standards such as ATM and ATM's QoS parameters (as discussed above).

One aspect affecting weight and power of a cell switch is the number of data packet storage units, for example, buffers, used to implement the multicast feature. In the past, multicast has been implemented using multiple buffers (e.g., one on the in-bound side of the switch, and one on the outbound side). The buffers store ATM cells until they are extracted for subsequent processing and eventual routing to specified destinations. This multiple buffer implementation is designed to support ATM QoS parameters. Though a multiple buffer implementation may be efficient for terrestrial switches, this approach is undesirable in space-based switches. This is so because such an implementation unnecessarily increases the weight and power consumption of the switch. Increased weight and power translates into higher spacecraft and launch costs and reduced throughput, which can translate into a loss of revenue. Additionally, increased complexity may result in lower reliability.

Terrestrial communication networks have been moving in recent years towards ATM standards. Often, it is desirable to link the terrestrial communication networks through a satellite system. In the past, however, there has been no efficient multicast capability available for space-based implementation, thus barring the progress of globally providing reliable and economic information transfer.

A need exists in the satellite communication industry for efficient multicast capability in a commercial satellite system.

BRIEF SUMMARY OF THE INVENTION

It is an object of the present invention to provide a method and apparatus for serial cell replication for multicast in an ATM cell switch.

It is another object of the present invention to minimize the size, weight, and power of a space-based multicast apparatus.

It is another object of the present invention to implement an efficient and fair distribution of bandwidth to separate Quality of Service queues resident in a buffer.

It is another object of the present invention to increase information bandwidth in satellite communications systems by implementing a multicast function using a buffer.

One or more of the foregoing objects is met in whole or in part by a method and apparatus for providing multicast in a satellite communication system. The present invention includes a buffer that stores data packets prior to replication for multicast. Preliminarily, the ATM cells requiring multicast are routed to a multicast module through the routing fabric of the switch. In the multicast module, the ATM cells are stored in one of several priority queues partitioned within a buffer. The preferred embodiment of the present invention uses a single buffer, partitioned into four priority queues. The buffer may be partitioned, for example, according to Quality of Service (QoS) classes, one partition for each class. The method of the present invention first assigns cells to queues based on the QoS requirement for the connection with which a cell is associated.

Next, the method of the present invention selects and extracts a cell from one of the queues based on an algorithm that provides fairness. The preferred algorithm takes into account priority, queue depth, and cell age, but could take into account any QoS or queueing parameters. The information payload portion of the selected cell is transferred into a holding buffer where it resides during the replication process. The header portion of the selected cell is sent to a header processor.

The method of the present invention then references a header memory to determine the number of cell copies to be made, the destination of each replicated cell, and associated new unique headers. The header processor includes a header input and an address output. Logic in the header processor generates an address signal on the address output in response to a header signal on the header input. In response to the address signal, the header memory sends to the header processor information necessary for replicating the information payload in the holding buffer.

Next, the present method merges the first unique header obtained from the header memory with the information payload of the selected cell in the holding buffer, and passes the assembled cell on to a subsequent processing unit for eventual routing to its final destination. The merging and subsequent processing are repeated with each unique header until all the cells required for replication have been made.

DETAILED DESCRIPTION OF THE INVENTION

Figure 1:
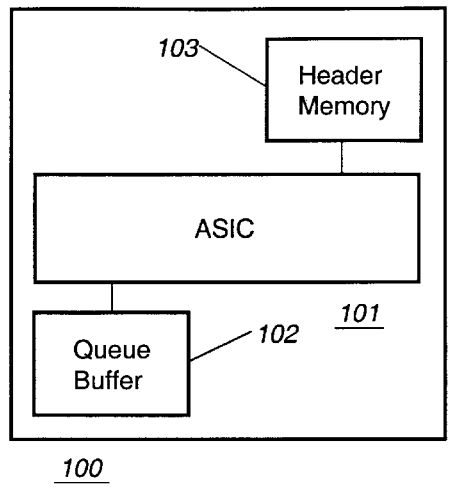
FIG. 1 illustrates a block diagram of a multicast module according to one embodiment of the present invention.

FIG. 1 shows a high level block diagram of a multicast module 100 which may, for example, provide an ATM multicast function. It is noted that although the discussion below proceeds with reference to ATM cells, the invention is not limited to ATM cells or ATM networks. The invention may be implemented with any other suitably formatted data that includes "header" information as generally described below. A data packet is typically comprised of an information payload and a header. The header includes the portion of the data packet that contains configuration information pertinent to that data packet. The header may be prepended, appended, or even interspersed in the information payload depending upon the data packet format.

Returning to FIG. 1, the multicast module 100 includes an ASIC 101, a buffer 102, and a header memory 103. Preferably, the ASIC 101 is radiation hardened for use in space in a satellite communication system. An ASIC, though preferable, is only one way in which the multicast module 100 may be implemented, however. Other alternatives include software executing on a microprocessor or discrete hardware components.

Figure 2:
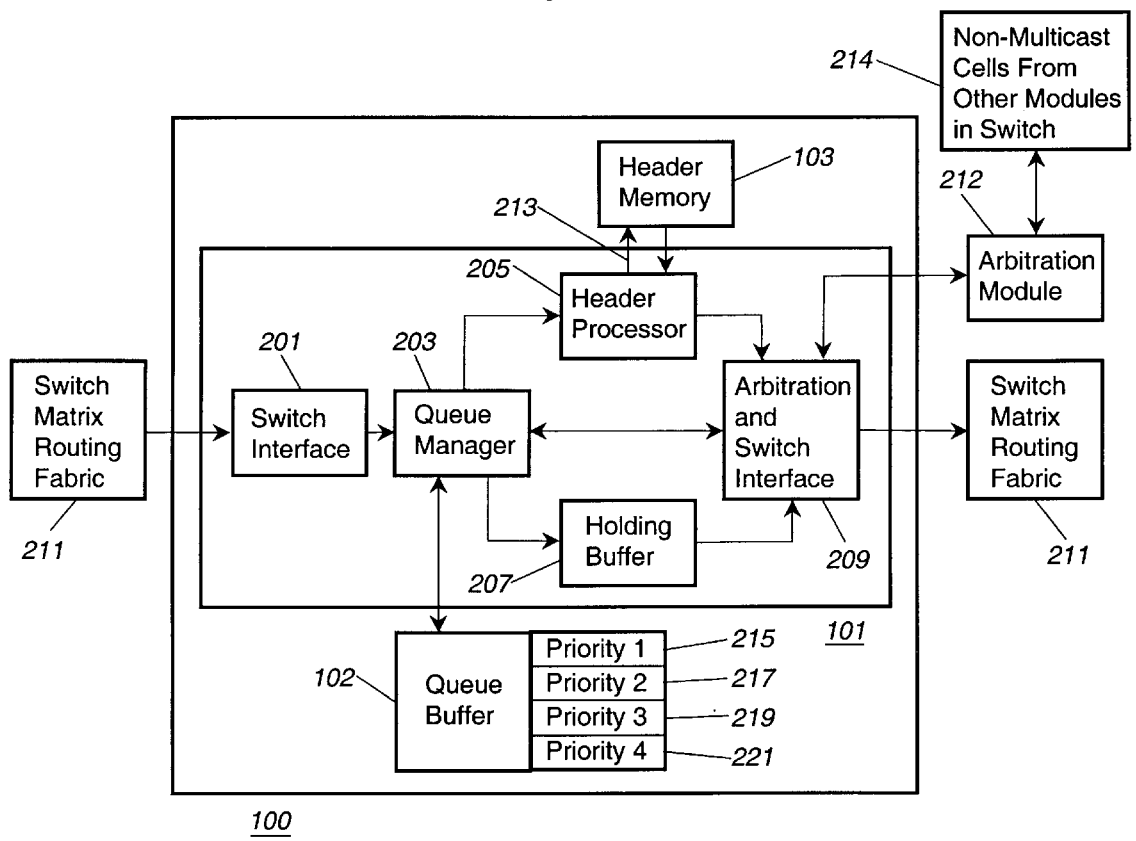
FIG. 2 illustrates a more detailed diagram of the multicast module from FIG. 1.

FIG. 2 shows a more detailed block diagram of a multicast module 100. Referring to FIG. 2, the ASIC 101 includes a switch interface 201, a queue manager 203, a header processor 205, a holding buffer 207, and the arbitration and switch interface 209. The switch interface 201 is connected to the queue manager 203. The queue manager 203 is connected to the buffer 102, to the header processor 205, to the holding buffer 207, and to the arbitration and switch interface 209. The header processor 205 is connected to the header memory 103. The header processor 205 and the holding buffer 207 are connected to an arbitration and switch interface 209, whose output, in turn, is fed back through the switch matrix routing fabric 211 for routing and eventual downlink transmission.

When a cell requires replication (a "multicast cell"), it is directed to the multicast module 100. A multicast cell may be designated as such, for example, by bits in the destination field (e.g., address bits) in the multicast cell's header. These bits indicate that the cell requires replication, and accordingly, the cell is directed to the multicast module 100.

The switch interface 201 receives a multicast cell for replication from the switch matrix routing fabric 211. The switch interface 201 may, for example, receive 32 bits at a time, and perform a data conversion to 64 bits. The conversion is used to place the multicast cells in the proper format for storage in one of the individual queues in the buffer 102.

Upon receiving a cell marked for multicast replication, the switch interface 201 may perform a cyclic redundancy check (CRC) on the received cell to ensure its validity. In other words, the switch interface 201 provides error checking for the received cell. If the switch interface 201 determines that the received cell is valid, the switch interface 201 sends the multicast cell on to the queue manager 203.

The queue manager 203 places the multicast cell into the buffer 102. Though a buffer 102 is used in the preferred embodiment, any data packet storage technique allowing partition may be used, including, for example, ordered lists or sorted pointers into a general purpose memory. The queue manager 203 typically adheres to a schedule whereby the queue manager 203 waits for a "write opportunity," i.e., a period of time in which the queue manager 203 may place a cell into the buffer 102. If the queue manager 203 receives a cell from the switch interface 201 during a scheduled write opportunity, the queue manager 203 places the multicast cell into the buffer 102. If the queue manager 203 receives a cell from the switch interface 201 when a write opportunity is not available, the queue manager 203 waits until a write opportunity becomes available, and at that time, places the multicast cell into the buffer 102.

The buffer 102 is preferably implemented as a single SRAM stack. For example, the buffer 102 may be a single 64k bit SRAM stack. The buffer 102 may then be partitioned into multiple priority queues. Although the buffer is preferably partitioned into four priority queues 215, 217, 219, and 221 as shown in FIG. 2, any number of priority queues may be established. Predetermined priority indicators identify the priority queue within the buffer 102 to which a cell may be assigned. The indicator may be in the cell itself, generated from the cell, or provided by a ground station.

In addition to placing cells in priority queues in the buffer 102, the queue manager 203 also determines the order in which to extract cells for replication and subsequent processing. Though each individual priority queue in the buffer 102 is serviced on a first in first out (FIFO) basis, the queue manager 203 may select a queue from which to extract a cell based on any number of parameters, including queue priority, queue depth, and cell age and QoS.

When cells are lined up in their respective priority queues, the queue manager 203 may use, for example, a priority scheme to determine which cell to extract for replication and subsequent processing. Thus, the queue manager 203 selects a cell from the queue with the highest priority. Priorities may be consecutively numbered from 1 through 4, for example, where a priority of 1 corresponds to the highest priority, and a priority of 4 corresponds to the lowest priority.

The queue manager 203 may also use queue depth to determine which cell to extract. If any one of the priority queues is growing excessively long, i.e., is holding an excessive number of cells, the queue manager 203 uses the queue depth as a threshold to determine from which queue to extract the next cell. If a predetermined queue depth threshold is surpassed for a particular queue, the queue manager 203 selects a cell from that queue for replication.

Similarly, the queue manager 203 may use cell age in making its cell extraction decision. If a queue has not been selected for a predetermined amount of time, and a specified cell age threshold is crossed, the queue manager 203 selects a cell from that queue.

Thus, if either the predetermined cell age threshold or the predetermined queue depth threshold is crossed for a particular queue, the queue manager 203 selects a cell from that queue. If none of the predetermined thresholds are crossed, the queue manager 203 extracts the cell from the queue with the highest priority. For example, where the queue manager 203 must choose between two cells, one with an associated priority of 1 and the other with an associated priority of 2, and neither queue's cell age threshold nor queue depth threshold has been crossed, the queue manager 203 extracts the cell with a priority of 1.

Likewise, when multiple thresholds are crossed, the queue manager 203 selects the cell residing in the queue with the highest priority. For example, where the queue manager 203 must choose between two cells, one residing in a queue with a priority of 1 and the other residing in a queue with a priority of 2, and the cell age threshold associated with each of theses queues has been crossed, the queue manager 203 extracts the cell from the queue with a priority of 1. Alternately, other priority schemes may be used to implement the queue manager 203 cell extraction decision process.

As mentioned previously, a cell is comprised of an information payload and a header. After the queue manager 203 extracts a given cell for replication, it preferably sends the information payload portion of the cell to the holding buffer 207 to be stored there during the replication process. The queue manager 203, in turn, sends the header of the selected cell to the header processor 205. In certain embodiments, the queue itself may be used as a holding buffer.

The header processor 205 uses, for example, the Virtual Path or Virtual Circuit identifiers in the header to address the header memory 103 in order to obtain information necessary for replication. Such information residing in the header memory 103 may include the destination of each replicated cell and the associated new header for each of these cells.

The header processor 205 includes a header input and an address output 213. Logic in the header processor 205 generates an address signal on the address output 213 in response to a header signal (not shown) on the header input. The header memory 103 is connected to the address output 213 and outputs the new unique headers and routing information for the multicast cells, either by retrieving them from memory or generating them with logic. In other implementations, the header memory 103 may output several headers in parallel for multiple simultaneous merging operations as described below.

The header memory 103 preferably contains all possible broadcast addresses in the communication system and their associated receivers. The header memory 103 is preferably implemented as an external memory component or internal ASIC memory. The header memory 103 outputs multiple unique headers, the number of which is determined by the number of cell copies designated to be made. As the header processor 205 obtains each header, the unique header is merged with the information payload residing in the holding buffer 207 to create a replicated cell. This merge may occur at the header processor 205, or alternately, at a subsequent processing unit, such as the arbitration and switch interface 209.

The merging of each header with the information payload may be accomplished, for example in the case of an ATM cell, by prepending the unique header to the information payload. Alternately, for other data packet formats, the merging process may be achieved by appending the header, or by distributing the header through the data packet. The merging and subsequent processing are repeated until all the designated replicated copies have been made. Alternately, the header addressing may be repeated as well, i.e., the header processor 205 repeatedly obtains a new header, merges the new header with the information payload, and sends the assembled cell on for subsequent processing.

When the final unique header for the particular information payload is received from the header memory 103 by the header processors 205, the holding buffer 207 may be readied for receipt of a new information payload.

As mentioned above, after the information payload and the header are merged, the assembled, replicated cell is passed on for subsequent processing. For example, the replicated cell may be submitted for arbitration to the arbitration module 212 by the arbitration and switch interface 209. The arbitration module 212 determines when a replicated cell may be sent through the switch matrix routing fabric 211 for eventual routing to its destination. As replicated cells from the multicast module 100 are attempting to reach their specified destinations, other modules (not shown) in the switch are also attempting to send non-multicast cells 214 to the same destination through the switch. Because the various modules are thus competing to send cells to the same destination, the arbitration module arbitrates these simultaneous requests and determines which cells will pass on through the switch matrix routing fabric 211.

Figure 3:
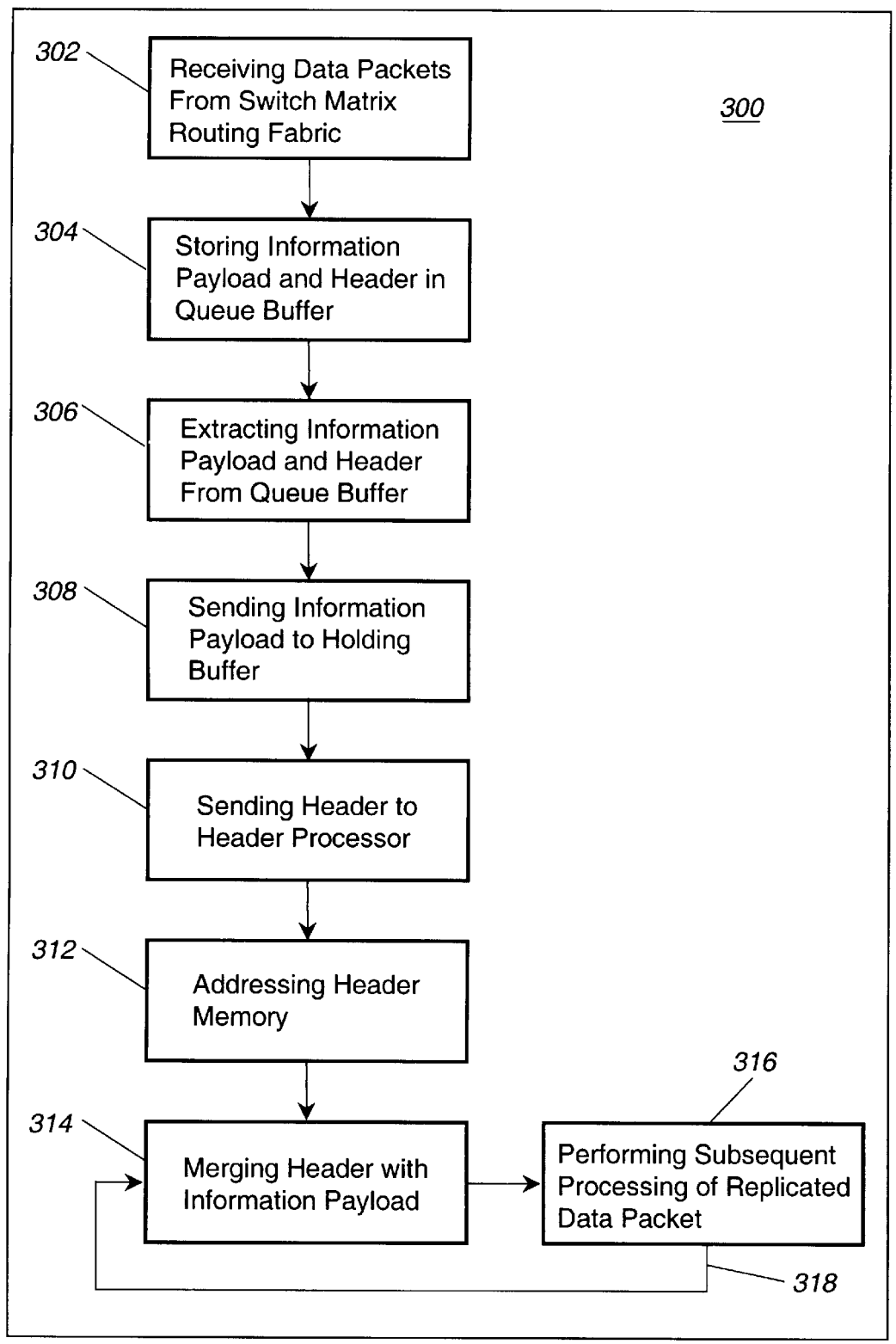
FIG. 3 illustrates a flow diagram of the processing occurring in the multicast module according to one embodiment of the present invention.

The flowchart of FIG. 3 supplements the discussion above with respect to FIGS. 1 and 2. FIG. 3 shows a flow diagram 300 of the processing occurring in the multicast module 100 according to one embodiment of the present invention. The method includes a receiving step 302, a storing step 304, an extracting step 306, and a buffering step 308. The method further includes a header provisioning step 310, an addressing step 312, a merging step 314, and a subsequent processing step 316.

Referring to FIG. 3, at the receiving step 302, a data packet, for example, an ATM cell, is received from the switch matrix routing fabric 211 of FIG. 1. The cell enters the multicast module 100 via the switch interface 201.

Subsequently, at the storing step 304, the multicast cell is stored in a buffer 102 (or other memory). The storing step 304 may be performed by the queue manager 203, using predetermined assignments to allocate the multicast cells to appropriate queues within the buffer 102. For example, an assignment corresponding to QoS parameters may be used to store a multicast cell in a particular priority queue within the buffer 102. However, general memories using other ordering techniques are also suitable.

At the extraction step 306, an information payload and its associated header are extracted from the buffer 102 for replication and subsequent processing. As explained above with respect to FIG. 2, the extraction step 306 may be performed by the queue manager 203 using any number of parameters, for example priority, cell age, queue depth, and QoS to make an extraction decision.

At the buffering step 308, the extracted information payload is sent to the holding buffer 207. The information payload remains in the holding buffer 207 during the replication process. At the header provision step 310, the header of the extracted cell is sent to the header processor 205.

At the addressing step 312, the header processor 205 accesses the header memory 103 to determine new unique headers for the information payload in the holding buffer 207. The header processor 205 uses the header of the extracted cell to send an associated address output 213 to the header memory 103. In response to the address output 213, the header memory 103 sends to the header processor 205 unique headers and routing information corresponding in number to the number of required replications.

At the merging step 314, upon obtaining a unique header associated with the information payload in the holding buffer 207, the header processor 205 merges the unique header with the information payload. Alternately, the merging step 314 may be performed at the subsequent processing step 316. The merging step 314 and the subsequent processing step 316 are repeated, as shown in FIG. 3 at 318, until all the cells requiring replication have been made and sent on for eventual downlink transmission. Alternately, the addressing step 312 may be repeated as well, i.e., the header processor 205 repeatedly obtains a new header, merges the new header with the information payload, and sends the assembled cell on for subsequent processing.

The present invention thus eliminates multiple buffers in implementing multicast functionality in a space-based cell switch. The multicast module 100 of the present invention thereby minimizes cell switch weight, power consumption, and complexity. As explained above, the minimization of components required to implement the multicast function substantially decreases the cost of the satellite and its associated launch costs, as well as increases reliability and bandwidth efficiency.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for implementing multicast in a satellite communication system, the method comprising:
   (a) receiving a received data packet to be multicast,
      wherein said received data packet includes a data packet priority indicator for said received data packet;
   (b) storing said received data packet in a buffer,
      wherein said buffer includes a plurality of queues,
      wherein each of said queues has a queue priority indicator,
      wherein said received data packet is inserted into one of said plurality of queues based on the data packet priority indicator of said received data packet;
   (c) extracting an extracted data packet from one of said plurality of queues,
      wherein said extracting step is based on quality-of-service parameters,
      wherein said quality-of-service parameters include at least one of cell error ratio and cell misinsertion rate;
   (d) storing an information payload of said extracted data packet in a holding buffer;
   (e) addressing a header memory to determine new headers for said information payload in said holding buffer; and
   (f) generating replicated data packets by individually merging each of said new headers with said information payload;
   wherein at least said generating step is performed on board a satellite.

2. The method of claim 1, further comprising, before said step of storing an information payload, the steps of: storing said data packet in a data packet storage unit, said data packet comprising said information payload and a header; and extracting said information payload and said header from said data packet storage unit in preparation for said replicating step.

3. The method of claim 2, wherein said step of storing said data packet in said data packet storage unit comprises storing said data packet in a buffer.

4. The method of claim 2, further comprising the step of, before said data packet storing step, receiving said data packet through a switch matrix routing fabric.

5. The method of claim 3, wherein said step of storing said data packets in said buffer comprises storing Asynchronous Transfer Mode (ATM) cells in said buffer.

6. The method of claim 1, further comprising the step of creating a plurality of priority queues in a buffer and storing data packets in said priority queues in accordance with a predetermined priority indicator associated with each of said data packets.

7. The method of claim 3, further comprising the step of partitioning said buffer to establish a plurality of queues.

8. The method of claim 2, wherein said step of extracting comprises extracting in accordance with a data packet priority parameter.

9. The method of claim 2, wherein said step of extracting comprises extracting in accordance with data packet queue depth and data packet age parameters.

10. The method of claim 1, wherein said step of addressing said header memory further comprises addressing with a header of said data packet.

11. The method of claim 1, wherein said step of addressing further comprises addressing with a Virtual Path Identifier or Virtual Circuit Identifier in a header of said data packet.

12. The method of claim 1, further comprising the step of forwarding said replicated data packets to a subsequent processing unit.

13. A satellite multicast module for replicating data packets comprising:
   a buffer including a plurality of queues for storing received data packets,
      wherein each of said queues has a queue priority indicator,
      wherein each of said received data packets includes a data packet priority indicator for said received data packet,
      wherein each of said received data packets is inserted into one of said plurality of queues based on the data packet priority indicator of said received data packet,
   a holding buffer for storing a selected information payload of an extracted data packet for replication;
      wherein said extracted data packet is extracted from one of said plurality of queues,
      wherein said extracted data packet is selected based on quality-of-service parameters,
      wherein said quality-of-service parameters include at least one of cell error ratio and cell misinsertion rate,
   a header processor including a header input and an address output, said header processor further comprising logic to generate an address signal on said address output in response to a header signal on said header input; and
   a header memory connected to said address output, said header memory outputting new headers and routing information for multicast data packets;

wherein at least said header memory is implemented on board a satellite.

14. The multicast module of claim 13 further comprising a buffer partitioned into a plurality of queues for storing multicast data packets.

15. The multicast module of claim 14 further comprising a queue manager connected to said buffer for selecting said selected data packet for replication.

16. The multicast module of claim 13 further comprising a switch interface for receiving data packets from a switch matrix routing fabric.

17. The multicast module of claim 14, wherein said plurality of queues are priority queues, and said data packets include a predetermined priority indicator.

18. The multicast module of claim 13, further comprising a plurality of priority queues in a buffer.

19. The multicast module of claim 15 wherein said queue manager comprises logic to extract said selected data packet in accordance with a data packet priority parameter.

20. The multicast module of claim 15 wherein said queue manager comprises logic to extract said selected data packet in accordance with data packet queue depth and data packet age parameters.

21. The multicast module of claim 13 wherein said data packets are ATM cells.

22. The multicast module of claim 21, wherein said header input accepts a Virtual Path or Virtual Circuit identifier in said data packet.

23. The multicast module of claim 13, further comprising a replicated data packet output connected to a subsequent processing unit.

24. A method for performing multicasting on-board a satellite, said method including:

receiving, on board a satellite, a received data packet to be multicast,
    wherein said received data packet includes a data packet priority indicator for said received data packet;

storing said received data packet in a buffer,
    wherein said buffer includes a plurality of queues,
    wherein each of said queues has a queue priority indicator,
    wherein said received data packet is inserted into one of said plurality of queues based on the data packet priority indicator of said received data packet;

extracting an extracted data packet from one of said plurality of queues,
    wherein said extracting step is based on quality-of-service parameters,
    wherein said quality-of-service parameters include at least one of cell error ratio and cell misinsertion rate, determining a plurality of destinations to receive said extracted data packet; and multicasting said extracted data packet by transmitting a copy of said data packet from said satellite to said plurality of destinations.

25. The method of claim 24 wherein said determining step is performed on board a satellite.

26. The method of claim 24 wherein said plurality of destinations is determined based on information in the data packet.

* * * * *